United States Patent
Malmberg et al.

(10) Patent No.: US 12,517,480 B2
(45) Date of Patent: Jan. 6, 2026

(54) METHOD AND APPARATUS FOR M-LEVEL CONTROL AND DIGITAL-TO-ANALOG CONVERSION

(71) Applicant: ETH Zurich, Zürich (CH)

(72) Inventors: Erik Hampus Niklas Malmberg, Uetikon am See (CH); Raphael Urs Keusch, Zürich (CH); Hans-Andrea Loeliger, Buchberg (CH)

(73) Assignee: ETH Zurich, Zurich (CH)

( * ) Notice: Subject to any disclaimer, the term of this patent is extended or adjusted under 35 U.S.C. 154(b) by 570 days.

(21) Appl. No.: 17/928,593

(22) PCT Filed: Jan. 26, 2021

(86) PCT No.: PCT/EP2021/051752
§ 371 (c)(1),
(2) Date: May 3, 2023

(87) PCT Pub. No.: WO2021/249673
PCT Pub. Date: Dec. 16, 2021

(65) Prior Publication Data
US 2023/0205149 A1    Jun. 29, 2023

(30) Foreign Application Priority Data

Jun. 11, 2020  (WO) .................. PCT/EP2020/066218

(51) Int. Cl.
*G05B 13/04*  (2006.01)
*H03M 1/66*  (2006.01)

(52) U.S. Cl.
CPC .......... *G05B 13/048* (2013.01); *H03M 1/661* (2013.01)

(58) Field of Classification Search
CPC ........ G05B 15/02; G05B 13/04; G05B 17/02; H03M 1/66
(Continued)

(56) References Cited

U.S. PATENT DOCUMENTS 11,698,625 B2 *  7/2023  Berntorp ............ G05B 19/4155
                                                               700/49
12,298,752 B2 *  5/2025  Raghavan ........ G05B 19/41885
(Continued)

FOREIGN PATENT DOCUMENTS

CN    106505927 A  *  3/2017
CN    111190350 A     5/2020
(Continued)

OTHER PUBLICATIONS

Geyer, T. "Model Predictive Control of High Power Converters and Industrial Drives", The Department of Information Technology and Electrical Engineering, Apr. 2016, pp. 1-22.
(Continued)

*Primary Examiner* — Ronald D Hartman, Jr.
(74) *Attorney, Agent, or Firm* — Anderson Patent Law Firm

(57) ABSTRACT

A method is disclosed for steering a physical analog system (e.g., an electric motor) using a discrete-level (e.g., binary) control signal. The discrete-level control signal is computed by an iterative scheme that can handle a long planning horizon. A preference for infrequent level switches can be taken into account. The quality of the fit to the target trajectory can be expressed not only by the quadratic error, but also by other norms. The method can be used also for digital-to-analog conversion.

18 Claims, 7 Drawing Sheets

(58) Field of Classification Search
USPC .......................................................... 700/28
See application file for complete search history.

(56) References Cited

U.S. PATENT DOCUMENTS

| | | | |
|---|---|---|---|
| 2009/0210081 A1* | 8/2009 | Sustaeta | H04L 67/125 |
| | | | 715/702 |
| 2015/0229233 A1 | 8/2015 | Quevedo et al. | |
| 2024/0019156 A1* | 1/2024 | Mostafavi | G05B 13/027 |

FOREIGN PATENT DOCUMENTS

| | | | | |
|---|---|---|---|---|
| EP | 2725706 A1 | 4/2014 | | |
| JP | 2015-532586 A | 11/2015 | | |
| JP | 2019-159619 A | 9/2019 | | |
| JP | 2024520874 A | * | 5/2024 | ........... G05B 13/048 |

OTHER PUBLICATIONS

Karamanakos, P. et al. "Model Predictive Control in Power Electronics: Strategies to Reduce the Computational Complexity", ETH Bibliothek, 2013, pp. 5818-5823.

Land, A.H. et al. "An Automatic Method of Solving Discrete Programming Problems", Econometrica, 1960, pp. 497-520, vol. 28, No. 3.

Loeliger, H. et al. "Factor Graphs with NUV Priors and Iteratively Reweighted Descent for Sparse Least Squares and More", International Symposium on Turbo Codes & Iterative Information Processing, 2018, pp. 1-5.

Loeliger, H. et al. "On Sparsity by NUV-EM, Gaussian Message Passing, and Kalman Smoothing", Comnell University Library, 2016, pp. 1-10.

Novak, M. et al. "Statistical Performance Verification of FCS-MPC Applied to Three Level Neutral Point Clamped Converter", 20th European Conference on Power Electronics and Applications, 2018, pp. 1-10.

Palmer, J.A. et al. "Variational EM Algorithms for Non-Gaussian Latent Variable Models", Advances in Neural Information Processing Systems, 2006, pp. 1059-1066.

Palmer, J.A. et al. "Variational Representations of Non-Gaussian Priors" Department of Electrical and Computer Engineering, 2005, pp. 1-16.

Richalet, J. et al. "Model Predictive Heuristic Control: Applications to Industrial Processes", Automatica, 1978, pp. 413-428, vol. 14.

Sallen, R.P. et al. "A Practical Method of Designing RC Active Filters", IRE Transactions—Circuit Theory, 1955, pp. 74-85, vol. 2, No. 1.

Tipping, M. "Sparse Bayesian Learning and the Relevance Vector Machine", Journal of Machine Learning Research, 2001, pp. 211-244, vol. 1.

Tipping, M. et al. "Fast Marginal Likelihood Maximisation for Sparse Bayesian Models", Proceedings of the Ninth International Workshop on Artificial Intelligence and Statistics, 2003, pp. 1-13.

Wipf, D. et al. "Sparse Bayesian Learning for Basis Selection", IEEE Transactions on Signal Processing, 2004, pp. 2153-2164, vol. 52, No. 8.

Wipf, D. et al. "A new view of automatic relevance determination" Advances in Neural Information Processing Systems, 2008, pp. 1625-1632.

Zhang, Y. et al. "Model Predictive Direct Power Control of a PWM Rectifier with Duty Cycle Optimization", IEEE Transactions on Power Electronics, 2013, pp. 5343-5351, vol. 28, No. 11.

* cited by examiner

METHOD AND APPARATUS FOR M-LEVEL CONTROL AND DIGITAL-TO-ANALOG CONVERSION

TECHNICAL FIELD

The invention relates to finite control set model predictive control (FCS-MPC) and digital-to-analog conversion by using methods from sparse Bayesian learning.

In particular, the invention relates to a method for controlling an analog physical system with at least one M-level input signal(s) as well as to a device for carrying out this method.

BACKGROUND ART

The problem of computing a binary, ternary, or M-level input signal to steer an analog physical system along some desired trajectory, or to make it produce some desired analog output signal, appears both in automatic control and in digital-to-analog conversion. This problem is not trivial (even for linear systems), and the computational complexity of known algorithms for computing "optimal" such input signals grows exponentially with the planning horizon [1].

In model predictive control (MPC), many pertinent methods have been developed [2, 3, 4, 5], with different trade-offs between "optimality" within a fixed (small) planning horizon vs. the ability to handle a long planning horizon. However, for applications requiring a long planning horizon, existing methods are often unsatisfactory.

One method for digital-to-analog conversion is to feed a digitally computed binary (or M-level) signal into an analog linear filter, which then produces (an approximation of) the desired analog signal. A standard method to compute the required binary (or M-level) signal uses a digital $\Delta\Sigma$ modulator, which, however, limits the planning horizon to a single step in time. Longer planning horizons can be achieved with the same methods (and with the same limitations) as in MPC.

In order to solve the limited-horizon problem, the disclosed method uses ideas originating from sparse Bayesian learning [6, 7, 8, 9] and variational representations of non-Gaussian distributions as in [10, 11, 12].

DISCLOSURE OF THE INVENTION

The problem solved by the invention is to compute a binary, ternary, or M-level input signal to steer a linear (or linearized) analog physical system along some desired trajectory, or to make it produce some desired analog output signal, by a method that can handle an arbitrarily long planning horizon. Moreover, a preference for sparsity can easily be added so that the number of level switches in the discrete input signal(s) is kept small.

The key idea is to represent the M-level constraint by a combination of suitably parameterized Gaussian distributions (as detailed in Section 4), which enables the actual computation of the M-level input signal by means of iterations of Kalman-type recursions (as detailed in Section 5). In consequence, the computational complexity per iteration grows only linearly with the planning horizon.

In formal terms, the invention is a method for controlling an analog physical system with input signal $u=(u_1, \ldots, u_K)$ to follow a given target trajectory $\check{y}=(\check{y}_1, \ldots, \check{y}_K)$, wherein at least one component ($u_{1,\ell}, \ldots, u_{K,\ell}$) of said input signal is discrete-valued with M levels, $M \in \{2, 3, \ldots\}$, wherein $u_k=(u_{k,1}, \ldots, u_{k,L}) \in \mathbb{R}^L$ is the input signal of the analog physical system at time $k \in \{1, \ldots, K\}$, $K \in \mathbb{N}$ (normally $K \gg 1$) is a planning horizon, L is the number of input signal components, $\ell$ (with $1 \leq \ell \leq L$) is the index of said discrete-valued component of u, $\check{y}_k=(\check{y}_{k,1}, \ldots, \check{y}_{k,H}) \in \mathbb{R}^H$ is the given target trajectory at time k, H is the number of components of the target trajectory, wherein said method uses an extended system model with output signal $\tilde{y}=(\tilde{y}_1, \ldots, \tilde{y}_K)$, $\tilde{y}_k \in \mathbb{R}^{\tilde{H}}$ for some $\tilde{H} \geq H$, and with input signal $\tilde{u}=(\tilde{u}_1, \ldots, \tilde{u}_K)$, $\tilde{u}_k \in \mathbb{R}^{\tilde{L}}$ for some $\tilde{L} \geq L$, such that $$u_k = S\tilde{u}_k \tag{1}$$

for some matrix S and all $k \in \{1, \ldots, K\}$, and with time-dependent parameters $\theta=(\theta_1, \ldots, \theta_K)$ and optional additional parameters $\zeta=(\zeta_1, \ldots, \zeta_K)$, wherein $\tilde{u}=(\tilde{u}_1, \ldots, \tilde{u}_K)$ is determined by iteratively executing, in iterations $i=1, 2, 3, \ldots$, the steps of (a) executing a maximization step in said extended system model with parameters $\theta$ fixed to $\theta^{(i-1)}$ and $\zeta$, fixed to $\zeta^{(i-1)}$, thereby obtaining a candidate input signal $(\tilde{u}_1^{(i)}, \ldots, \tilde{u}_K^{(i)})$ with optional precision information $(V_{\tilde{U}_1}^{(i)}, \ldots, V_{\tilde{U}_K}^{(i)})$, and an output signal $(\tilde{y}_1^{(i)}, \ldots, \tilde{y}_K^{(i)})$ with optional precision information $(V_{\tilde{Y}_1}^{(i)}, \ldots, V_{\tilde{Y}_K}^{(i)})$, and (b) determining new parameters $\theta(\theta_1^{(i)}, \ldots, \theta_K^{(i)})$ and optionally $\zeta^{(i)}=(\zeta_1^{(i)}, \ldots, \zeta_K^{(i)})$, where $\theta_k^{(i)}$ is a function of $\tilde{u}_k^{(i)}$ and $V_{\tilde{U}_k}^{(i)}$, and $\zeta_k^{(i)}$ is a function of $\tilde{y}_k^{(i)}$ and $V_{\tilde{Y}_k}^{(i)}$ as computed in Step (a), and wherein said extended system model can be expressed as $$p(\tilde{u},\mathring{y},\tilde{x}_0,\tilde{e}|\theta,\zeta) \propto p(\mathring{y}|\tilde{u},\tilde{x}_0,\tilde{e},\zeta)\rho(\tilde{u},\theta)p(\tilde{x}_0)p(\tilde{e}) \tag{2}$$

wherein $p(\tilde{u}, \mathring{y}, \tilde{x}_0, \tilde{e}|\theta, \zeta)$ is a probability density function in $\tilde{u}, \mathring{y}, \tilde{x}_0$ and $\tilde{e}$ with parameters $\theta$ and $\zeta$, $\mathring{y}=(\mathring{y}_1, \ldots, \mathring{y}_K)$, $\mathring{y}_k \in \mathbb{R}^{\mathring{H}}$, is the target trajectory of said extended system model comprising $\check{y}$ and optionally additional trajectories, "$\propto$" denotes equality up to a scale factor, said analog physical system is modeled by a discrete-time linear state space model recursions $$x_k = A_k x_{k-1} + B_k u_k + D_k e_k \tag{3}$$

$$y_k = C_k x_k \tag{4}$$

for $k \in \{1, \ldots, K\}$, and with state vector $x_k \in \mathbb{R}^N$, initial state $x_0$ noise $e_k \in \mathbb{R}^G$, model, output $y_k \in \mathbb{R}^H$ and matrices $A_k, B_k, C_k, D_k$, said method uses an extended version of model (3) and (4) which is given by the state space recursions $$\tilde{x}_k = \tilde{A}_k \tilde{x}_{k-1} + \tilde{B}_k S \tilde{u}_k + \tilde{D}_k \tilde{e}_k \tag{5}$$

$$\tilde{y}_k = \tilde{C}_k \tilde{x}_k \tag{6}$$

for $k \in \{1, \ldots, K\}$, and with state vector $x_k \in \mathbb{R}^{\tilde{N}}$ with $\tilde{N} \geq N$, initial state $\tilde{x}_0$, noise $\tilde{e}_k \in \mathbb{R}^{\tilde{G}}$ with $\tilde{G} \geq G$, and wherein the matrices $\tilde{A}_k, \tilde{B}_k, \tilde{C}_k$ and $\tilde{D}_k$ are derived from $A_k, B_k, C_k$ and $D_k$, $p(\mathring{y}|\tilde{u}, \tilde{x}_0, \tilde{e}, \zeta)$ is given by $$p\left(\mathring{y} \mid \tilde{u}, \tilde{x}_0, \tilde{e}, \zeta\right) \propto \exp\left(-\frac{1}{2}\sum_{k=1}^{K}\left(\mathring{y}_k - \tilde{y}_k\right)^T W_k \left(\mathring{y}_k - \tilde{y}_k\right)\right)\psi(\mathring{y}, \zeta) \tag{7}$$

where $W_k$ is a real non-negative weight matrix and where $\tilde{y}_k$ is the extended system model output signal determined by (5) and (6), $\psi(\tilde{y}, \zeta)$ is an optional factor in (7), which means it is either 1, or if present, it may take the form $$\psi(\tilde{y}, \zeta) = \prod_{k=1}^{K} \psi_k(\tilde{y}_k, \zeta_k) \tag{8}$$

such that, for fixed $\zeta_k$, $\psi_k(\tilde{y}_k, \zeta_k)$ is a Gaussian probability density function in up to a scale factor, $p(\tilde{x}_0)$ is a Gaussian probability density, $p(\tilde{e})$ factors as $$p(\tilde{e}) = \prod_{k=1}^{K} p(\tilde{e}_k) \tag{9}$$

where each $p(\tilde{e}_k)$ is a Gaussian probability density, $p(\tilde{u}, \theta)$ factors as $$p(\tilde{u}, \theta) = \prod_{k=1}^{K} \rho_k(\tilde{u}_k, \theta_k) \tag{10}$$

such that, for fixed $\theta_k$, $\rho_k(\tilde{u}_k, \theta_k)$ is a Gaussian probability density function in $u_k$, up to a scale factor, and for at least one index $\bar{\ell} \in \{1, \ldots, L\}$, $\rho_k(\tilde{u}_k, \theta_k)$ contains as a factor the product $$\mathcal{N}(\tilde{u}_{k,\bar{\ell}}; m_1, \sigma_{k,1}^2) \ldots \mathcal{N}(\tilde{u}_{k,\bar{\ell}}; m_J, \sigma_{k,J}^2) \tag{11}$$

of J≥2 Gaussian probability density functions with different means $m_1, \ldots, m_J$ and with variances $\sigma_{k,1}^2, \ldots, \sigma_{k,J}^2$ determined by $\theta_k$.

The invention also relates to a device for carrying out this method. This device comprises:

an output interface for generating said input signal u to the analog physical system and a digital control unit connected to said output interface and adapted and structured to carry out the above method.

Finally, the invention also relates to a use of the method or device for at least one of the following applications:

digital-to-analog conversion by feeding a discrete-valued signal into an analog low-pass filter, digital-to-analog conversion by feeding a discrete-valued signal into an analog band-pass filter, controlling an electric motor with at least one discrete-level input signal, controlling an electric power converter with at least one discrete-level input signal.

BRIEF DESCRIPTION OF THE DRAWINGS

The invention will be better understood and objects other than those set forth above will become apparent when consideration is given to the following detailed description thereof. This description makes reference to the annexed drawings, wherein.

MODES FOR CARRYING OUT THE INVENTION

As mentioned, the key idea of the disclosed invention is to represent the M-level constraint by a combination of parameterized Gaussian distributions, as will be detailed in Section 4 below. However, this key idea requires a context of several other (mostly well-known) concepts, as will be explained in Sections 3, 5 and 6. Throughout Sections 3-5, a digital-to-analog converter as in Section 2.1 will be used for illustration. Further examples (i.e., further embodiments of the disclosed invention) will be given in Sections 7 and 10.

1 Notation

We denote the all-zero vector of length N by $0_N$, the all zero matrix of dimension N×M by $0_{N \times M}$, the all-ones vector of length N by $1_N$, the all-ones matrix of dimension N×M by $1_{N \times M}$ and the identity matrix of dimension N×N by $I_N$.

Further, the probability density function of a univariate Gaussian distribution in $x \in \mathbb{R}$ with mean $m \in$ ' and variance $\sigma^2 \in \mathbb{R}$ is denoted by $$\mathcal{N}(s; m, \sigma^2) = \frac{1}{\sqrt{2\pi\sigma^2}} \exp\left(-\frac{(x-m)^2}{2\sigma^2}\right). \tag{12}$$

The probability density function of a multivariate Gaussian distribution in $x \in \mathbb{R}^N$ with mean vector $m \in \mathbb{R}^N$ and covariance matrix $V \in \mathbb{R}^{N \times N}$ is denoted by $$\mathcal{N}(xz; m, V) = \frac{1}{\sqrt{(2\pi)^N |V|}} \exp\left(-\frac{1}{2}(x-m)^T V^{-1}(x-m)\right). \tag{13}$$

2 System Overview

Figure 1:
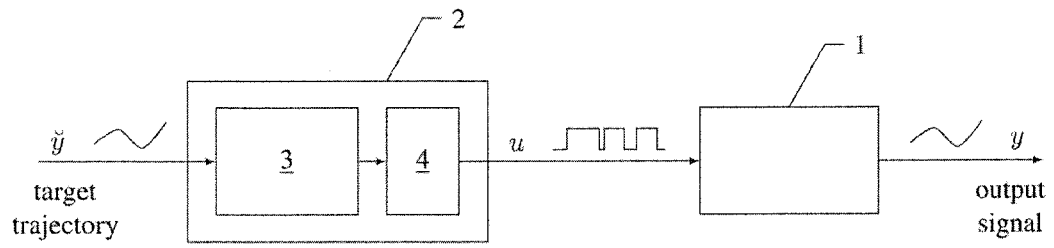
FIG. 1 shows the system model with an analog physical system and a control unit, comprising a digital control unit and an output interface.

As shown in FIG. 1, the present invention relates to techniques for controlling an analog physical system 1 by means of a device 2. For example, system 1 may be a low-pass or band-pass filter as part of a digital-to-analog converter, an electric motor, or the load in a electric power converter.

System 1 has at least one input signal u that can take on at least M>1 discrete levels and at least one output signal y.

Device 2 comprises an output interface 4 for generating the input signal u. For example, the output interface 4 may be a binary or ternary output port of device 2.

Further, device 2 comprises a control unit 3, such as a microprocessor or FPGA, adapted to carry out the steps of the method described here. Device 2 is adapted to generate the input signal u in such a manner that the output signal y follows a desired trajectory (target trajectory).

2.1 Example

As a first example, consider a digital-to-analog converter wherein the analog physical system 1 of FIG. 1 is a simple (i.e., low-cost) analog low-pass filter. The analog filter is exemplified by the circuit in FIG. 2, which shows a Sallen-Key low-pass filter [13]. The task of the digital control unit 3 and the output interface 4 is to produce a two-level input signal u to the analog filter such that the resulting output waveform y closely approximates any given target waveform y̌, as illustrated in FIG. 3. This task is solved by the disclosed invention as will be detailed below. Moreover, in Sections 3 and 5, this example will be used to illustrate the concepts and methods of this disclosure.

3 Analog-System Model

The linear state space model (3) and (4) represents the given analog physical system. Such a state space model can be obtained by well-known methods (including discretization in time and linearization) from an underlying continuous-time state space model. However, the method utilizes an extended system model (5) and (6) which is an extended version of said analog physical system model and may contain additional inputs, states or outputs.

3.1 Example

In the example of Section 2.1, we have a single scalar input signal $u=(u_1, \ldots, u_K)$ (i.e., L=1) and a single scalar output y (i.e., H=1). Between ticks $t_k$ and $t_{k+1}$ of the digital clock, the continuous-time input voltage is kept at the constant level $u_k$ (cf. FIG. 3). For the specific circuit of FIG. 2, we obtain a state space representation of the form (3) and (4) with $x_k \in \mathbb{R}^3$ as follows.

Figure 2:
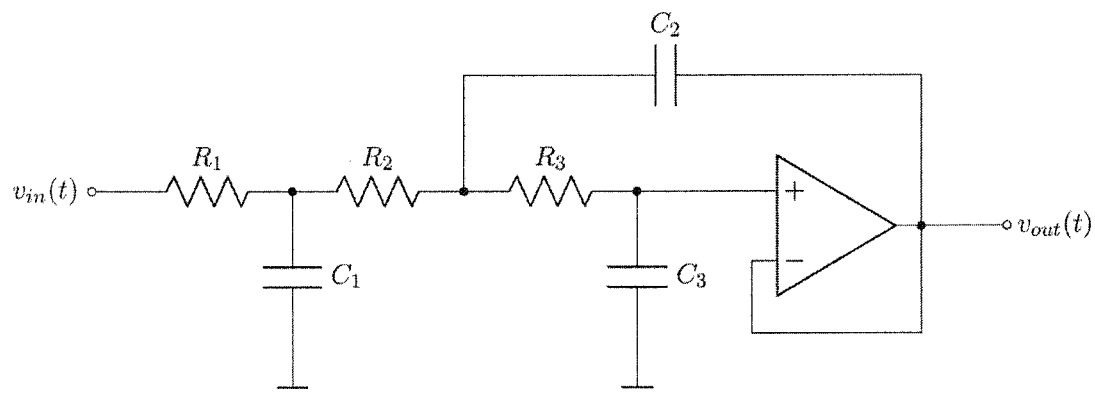
FIG. 2 shows a third order low-pass filter in Sallen-Key topology.
Figure 3:
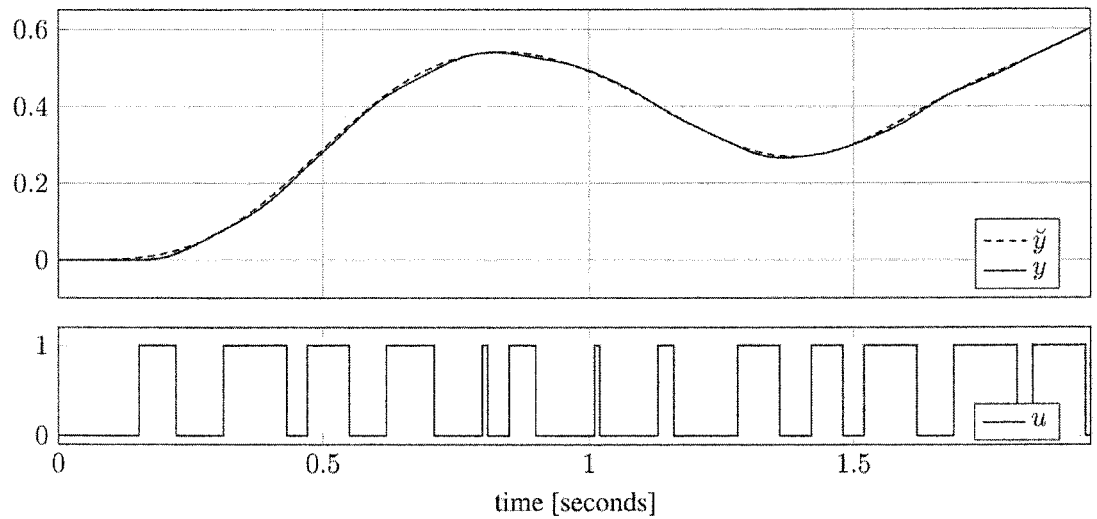
FIG. 3 shows a numerical example of the DAC of FIGS. 1 and 2.

The numerical example in FIG. 3 is obtained with the following values for the components in FIG. 2:

$$R_1 = 9.1 \text{ k}\Omega, C_1 = 16 \text{ μF}, \tag{14}$$

$$R_2 = 82 \text{ k}\Omega, C_2 = 1.3 \text{ μF}, \tag{15}$$

$$R_3 = 36 \text{ k}\Omega, C_3 = 2 \text{ μF}. \tag{16}$$

The resulting frequency response is $$\frac{\text{output voltage}}{\text{input voltage}} = \left| \frac{270.535}{(i\omega)^3 + 16.926(i\omega)^2 + 108.160(i\omega) + 270.535} \right| \tag{17}$$

with $i=\sqrt{-1}$ and frequency $f=\omega/(2\pi)$. The corresponding discrete-time model of the analog physical system is given by $$A_k = \begin{bmatrix} 0.83941 & -1.006 & -2.48427 \\ 0.00918 & 0.99485 & -0.01278 \\ 0.00005 & 0.00998 & 0.99996 \end{bmatrix}, \tag{18}$$

$B_k=[0.00918\ 0.00005\ 0]^T$, $C_k=[0\ 0\ 270.53523]$, and $D_k=[0\ 0\ 0]^T$. The state space matrices of the extended system model for this example are trivially given by $\tilde{A}_k=A_k$, $\tilde{B}_k=B_k$, $\tilde{C}_k=C_k$, and $\tilde{D}_k=D_k$.

3.2 Beyond the Example

In the above example, the matrices $A_k$, $B_k$, $C_k$ and $D_k$ do not depend on k, but in general, they might. In fact, these matrices may even depend on the iteration step i (e.g., as a consequence of customary linearization techniques). Moreover, in general, the analog physical system may have multiple inputs (L≥1) and/or multiple outputs (H≥1), cf. Section 10.1. Not all input signals need be restricted to discrete levels. In addition, the system model may also be driven by stochastic noise, hence the term $D_k e_k$ in (3).

4 M-Level Priors

For ease of exposition, we assume here a single scalar input signal (i.e., L=1).

4.1 Two-Level Prior

Restricting the analog-system input signal u to two levels {a, b} can be achieved with $$S=1 \tag{19}$$

in (1), i.e., $\tilde{L}=1$ and $u=\tilde{u}$, and with $\rho_k(\tilde{u}_k, \theta_k)$ and $\theta_k$ in (10) as $$\rho_k(\tilde{u}_k, \theta_k) = \mathcal{N}(\tilde{u}_k; a, \sigma_{k,1}^2) \mathcal{N}(\tilde{u}_k; b, \sigma_{k,2}^2) \tag{20}$$

and $\theta_k = (\sigma_{k,1}^2, \sigma_{k,2}^2)$. For fixed $\theta_k$, the function (20) is a product of two Gaussian probability density functions, which is again a Gaussian probability density function, up to a scale factor.

Figure 4:
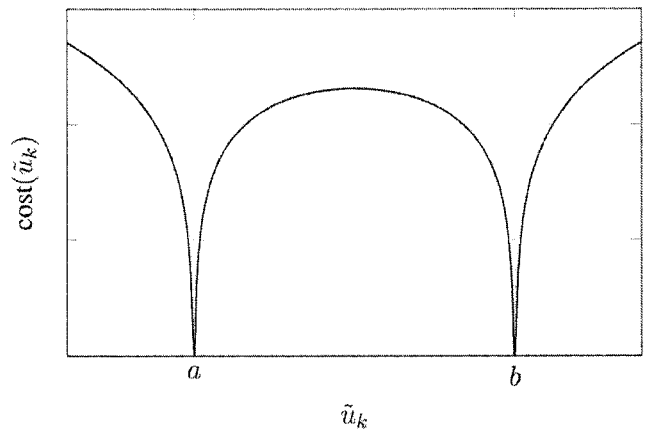
FIG. 4 shows the cost function of eq. (22) for a two-level constraint.

The function $$\max_{\theta_k} \rho_k(\tilde{u}_k, \theta_k) \tag{21}$$

can be viewed as a prior on $u_k$ $(=\tilde{u}_k)$ that strongly encourages $u_k$ to lie in {a, b}, as is obvious from FIG. 4, which shows the function $$\text{cost}(u_k) = -\log \max_{\theta_k} \rho_k(u_k, \theta_k). \tag{22}$$

4.2 Three-Level Prior

Restricting the analog-system input signal u to three levels {b, 0, −b} can be achieved with $$S=[1\ 1] \tag{23}$$

i.e., $\tilde{L}=2$ and $u_k=\tilde{u}_{k,1}+\tilde{u}_{k,2}$, and with $\rho_k(\tilde{u}_k, \theta_k)=\rho_k(\tilde{u}_{k,1}, \tilde{u}_{k,2}, \theta_k)$ in (10) as $$\rho_k(\tilde{u}_{k,1}, \tilde{u}_{k,2}, \theta_k) = \mathcal{N}(\tilde{u}_{k,1}; 0, \sigma_{k,1,1}^2) \mathcal{N}(\tilde{u}_{k,1}; b, \sigma_{k,1,2}^2) \cdot \\ \mathcal{N}(\tilde{u}_{k,2}; 0, \sigma_{k,2,1}^2) \mathcal{N}(\tilde{u}_{k,2}; -b, \sigma_{k,2,2}^2) \tag{24}$$

with $\theta_k = (\sigma_{k,1,1}^2, \sigma_{k,1,2}^2, \sigma_{k,2,1}^2, \sigma_{k,2,2}^2)$. Again, for fixed $\theta_k$, the function (24) is a Gaussian probability density function, up to a scale factor.

Figure 5:
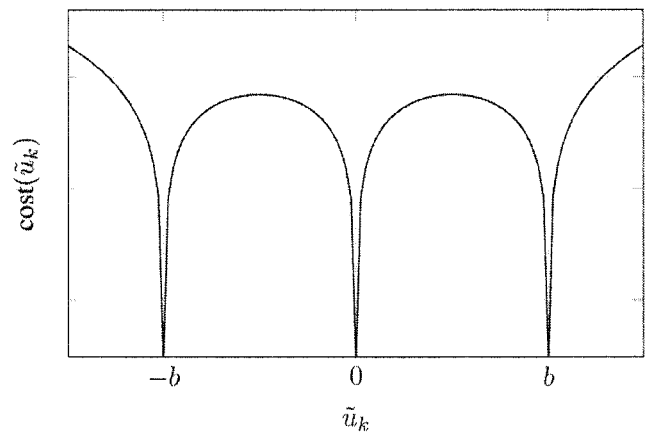
FIG. 5 shows the cost, function or eq. (25) for a three-level constraint.

In this case, the function (21) can be viewed as a prior on $\tilde{u}_k$ that strongly encourages $u_k = S\tilde{u}_k$ to lie in {b, 0, −b}, as is obvious from FIG. 5, which shows the function $$\text{cost}(u_k) = -\log \max_{\tilde{u}_k: S\tilde{u}_k = u_k} \max_{\theta_k} \rho_k(u_k, \theta_k). \tag{25}$$

The three-level prior is a combination of two two-level priors whereas S acts as a mapping between the two-level components of ũ and the three-level component of u.

4.3 Four-Level Prior

Restricting the analog-system input signal u to four levels {0, 2b, 3b} can be achieved with $$S=[1\ 1\ 1], \tag{26}$$

i.e., $\tilde{L}=3$ and $\tilde{u}_k = \tilde{u}_{k,1} + \tilde{u}_{k,2} + \tilde{u}_{k,3}$, and with $\rho_k(\tilde{u}_k, \theta_k) = \rho_k(\tilde{u}_{k,1}, \tilde{u}_{k,2}, \tilde{u}_{k,3}, \theta_k)$ in (10) as $$\rho_k(\tilde{u}_{k,1}, \tilde{u}_{k,2}, \tilde{u}_{k,3}, \theta_k) = \mathcal{N}(\tilde{u}_{k,1}; 0, \sigma_{k,1,1}^2) \mathcal{N}(u_{k,1}; b, \sigma_{k,1,2}^2) \cdot \mathcal{N}(\tilde{u}_{k,2}; 0, \sigma_{k,2,1}^2) \mathcal{N}(\tilde{u}_{k,2}; b, \sigma_{k,2,2}^2) \cdot \mathcal{N}(\tilde{u}_{k,3}; 0, \sigma_{k,3,1}^2) \mathcal{N}(\tilde{u}_{k,3}; b, \sigma_{k,3,2}^2) \quad (27)$$

with $\theta_k = (\sigma_{k,1,1}^2, \sigma_{k,1,2}^2, \sigma_{k,2,1}^2, \sigma_{k,2,2}^2, \sigma_{k,3,1}^2, \sigma_{k,3,2}^2)$. Again, for fixed $\theta_k$, the function (27) is a Gaussian probability density function, up to a scale factor.

Figure 6:
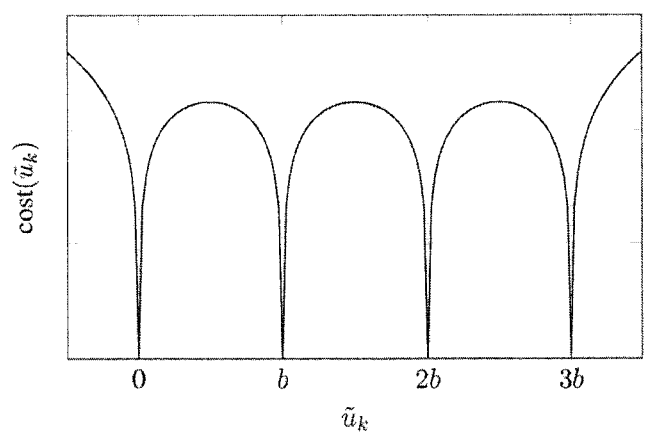
FIG. 6 shows the cost function of eq. (28) for a four-level constraint.

In this case, the function (21) can be viewed as a prior on $\tilde{u}_k$ that strongly encourages $u_k = S\tilde{u}_k$ to lie in $\{0, b, 2b, 3b)\}$, as is obvious from FIG. 6, which shows the function $$\text{cost}(u_k) = -\log \max_{\tilde{u}_l : S\tilde{u}_k = u_k} \max_{\theta_k} \rho_k(\tilde{u}_k, \theta_k). \quad (28)$$

4.4 M-Levels

M-level priors with M>3 can be achieved, in more than one way, by generalizations of (23) and (24) with $$\rho_k(\tilde{u}_{k,1}, \ldots, \tilde{u}_{k,\tilde{L}}, \theta_k) = \prod_{\tilde{l}=1}^{\tilde{L}} \prod_{j=1}^{J_{\tilde{l}}} \mathcal{N}(\tilde{u}_{k,\tilde{l}}; m_{\tilde{l},j}, \sigma_{k,\tilde{l},j}^2) \quad (29)$$

with fixed means $m_{\tilde{l},j}$ and with $\theta_k$ comprising the variances $\sigma_{k,\tilde{l},j}^2$. Advantageously, the components $\tilde{u}_{k,\tilde{l}}$ are restricted to two levels and S is an all-ones vector.

5 Extended System Model and Algorithms

The analog physical system is modeled by a discrete-time linear state space model with state recursions (3) and output relation (4) where the matrices $A_k$, $B_k$, $C_k$ and $D_k$ are obtained using well-known methods. Said model consists of L input signal components, N states and H output signal components where at least one input signal component is discrete-valued. One may use $D_k$ and $e_k$, to model any present system noise. For the sake of simplicity, said system noise is omitted in the given examples of Sections 5, 7 and 10.

The disclosed method, however, utilizes an extended system model (5) and (6) which is an extended version of said analog physical system model and may contain additional inputs, states or outputs. In the example of Section 2.1, the extended system model is trivially given by the analog physical model since no additional inputs signal components, states or output signal components are needed. Beyond this example, additional inputs signal components may be used to model discrete-valued inputs for M>2, as shown in Section 4. Additional states and output signal components may be introduced, for example, to map input level differences to additional output signal components, as detailed in Section 7.

The extended system model comprises, besides (5) and (6), also the function (7), the prior $\rho(\tilde{u}, \theta)$, the initial state distribution $p(\tilde{x}_0)$, and the noise distribution $p(\tilde{e})$ and is summarized in (2).

5.1 Harnessing Linear Gaussian Estimation

For fixed parameters $\theta$ (and $\zeta$, if applicable), the extended system model (2) is a customary linear-Gaussian model. In particular, the posterior distributions $p(\tilde{u}|\mathring{y}, \theta, \zeta)$ and $p(\tilde{y}|\mathring{y}, \theta, \zeta)$ are both jointly Gaussian, and the MAP (maximum a posteriori) estimates of $\tilde{u}$ and $\tilde{y}$ coincide with their MMSE (mini-mum mean-squared error) estimates. Moreover, the estimate of $\tilde{u} = (\tilde{u}_1, \ldots, \tilde{u}_K)$ with $\tilde{u}_k = (\tilde{u}_{k,1}, \ldots, \tilde{u}_{k,L})$, the estimate of $\tilde{y} = (\tilde{y}_1, \ldots, \tilde{y}_K)$ with $\tilde{y}_k(\tilde{y}_{k,1}, \ldots, \tilde{y}_{k,H})$ and the corresponding sequence of posterior variances $V_{\tilde{U}} = (V_{\tilde{U}_1}, \ldots, V_{\tilde{U}_K})$ with $V_c = (V_{\tilde{U}_{k,1}}, \ldots, V_{\tilde{U}_{k,L}})$, and $V_{\tilde{Y}} (V_{\tilde{Y}_1}, \ldots, V_{\tilde{Y}_K})$ with $V_{\tilde{Y}_k} = (V_{\tilde{Y}_{k,1}}, \ldots, V_{\tilde{Y}_{k,H}})$ can be computed by well-known recursive algorithms (variations of Kalman filter algorithms) with complexity linear in K. A preferred such algorithm is the MBF algorithm augmented with input signal estimation as described in Section V of [14]. Alternatively, the estimates of $\tilde{u}$ and $\tilde{y}$ (but not their variances) can be computed by steepest-descent or other customary optimization algorithms.

Accordingly, the input signal it can be computed by alternating, in iterations i=1, 2, 3, ..., the steps of (a) computing the estimates $\tilde{u}^{(i)} = (\tilde{u}_1^{(i)}, \ldots, \tilde{u}_K^{(i)})$ and $\tilde{y}^{(i)} = (\tilde{y}_1^{(i)}, \ldots, \tilde{y}_K^{(i)})$ and optionally the precision information $V_{\tilde{U}}^{(i)} = (V_{\tilde{U}_1}^{(i)}, \ldots, V_{\tilde{U}_K}^{(i)})$ and $V_{\tilde{Y}}^{(i)} = (V_{\tilde{Y}_1}^{(i)}, \ldots, V_{\tilde{Y}_K}^{(i)})$ for fixed parameters $\theta = \theta^{(i-1)}$ and $\zeta = \zeta^{(i-1)}$, and (b) determining new parameters $\theta^{(i)}$ based on $\tilde{u}^{(i)}$ (and perhaps $V_{\tilde{U}}^{(i)}$) and new parameters $\zeta^{(i)}$ based on $\tilde{y}^{(i)}$ (and perhaps $V_{\tilde{Y}}^{(i)}$), as computed in Step (a).

The following two Sections describe two ways to determine new parameters $\theta$. Specific ways to determine the optional parameters $\zeta$ are given in Sections 7 and 8.

5.2 Determining the Variances by Alternating Maximization

One possibility for Step (b) above is to determine the new parameters by $$\theta^{(i)} = \underset{\theta}{\text{argmax}} \; p(\tilde{u}^{(i)}, \mathring{y} \mid \theta, \zeta^{(i-1)}) \quad (30)$$

$$= \underset{\theta}{\text{argmax}} \; p(\tilde{u}^{(i)}, \theta), \quad (31)$$

which splits into $$\theta_k^{(i)} = \underset{\theta_k}{\text{argmax}} \; \rho_k(\tilde{u}_k^{(i)}, \theta_k) \quad (32)$$

for $k \in \{1, \ldots, K\}$, which can be expressed in closed form: for $\rho_k(\tilde{u}_{k,1}, \ldots, \tilde{u}_{k,\tilde{L}}, \theta_k)$ as in (29), we obtain $$(\sigma_{k,\tilde{l},j}^2)^{(i)} = (\tilde{u}_{k,\tilde{l}}^{(i)} - m_{\tilde{l},j})^2. \quad (33)$$

Using (32) amounts to effectively using the prior (21). The posterior variances $(Y_{\tilde{U}_1}, \ldots, V_{\tilde{U}_K})$ are not required.

5.3 Determining the Variances by Expectation Maximization

Another possibility for Step (b) is to determine the new parameters by expectation maximization as follows:

$$\theta^{(i)} = \underset{\theta}{\text{argmax}} \; E[\log \; p(\tilde{U}, \mathring{y} \mid \theta, \zeta^{(i-1)})], \quad (34)$$

where the expectation is with respect to $p(\tilde{u}|\mathring{y}, \theta^{(i-1)}, \zeta^{(i-1)})$. But (34) simplifies to $$\theta_k^{(i)} = \underset{\theta_k}{\text{argmax}} \; E[\log \; \rho_k(\tilde{U}_k, \theta_k)], \quad (35)$$

for $k \in \{1, \ldots, K\}$, where the expectation is with respect to $p(\tilde{u}_k|\mathring{y}, \theta^{(i-1)}, \zeta^{(i-1)})$. For $\rho_k(\tilde{u}_{k,1}, \ldots, \tilde{u}_{k,\tilde{L}}, \theta_k)$ as in (29), we obtain $$\left(\sigma_{k,\tilde{l},j}^2\right)^{(i)} = E\left[\left(\tilde{U}_{k,\tilde{l}} - m_{\tilde{l},j}\right)^2\right] \tag{36}$$

$$= V_{\tilde{U}_{k,\tilde{l}}}^{(i)} + (\tilde{u}_{k,\tilde{l}}^{(i)})^2 - 2m_{\tilde{l},j}\tilde{u}_{k,\tilde{l}}^{(i)} + m_{\tilde{l},j}^2. \tag{37}$$

Example

In the example of Section 2.1, the function (7) can be written as $$p\left(\overset{\circ}{y} \mid \tilde{u}, \tilde{x}_0, \tilde{e}, \zeta\right) \propto \exp\left(-\frac{1}{2}\sum_{k=1}^{K} w\left(\overset{\circ}{y}_k - \tilde{y}_k\right)^2\right) \tag{38}$$

with weight w>0, $\mathring{y}=\breve{y}$ and with $\rho(\tilde{u}, \theta)$ as in (10) and (20) with a=0 and b=1. From (20), we have $\theta_k=(\sigma_{k,1}^2, \sigma_{k,2}^2)$. Determining $\theta^{(i)}$ by (32) results in $$\sigma_{k,1}^{(i)} = (\tilde{u}_k^{(i)})^2 \tag{39}$$

and $$\sigma_{k,2}^{(i)} = (\tilde{u}_k^{(i)} - b)^2. \tag{40}$$

Determining $\theta^{(i)}$ by (35) results in $$\sigma_{k,1}^{(i)} = V_{U_k}^{(i)} + (\tilde{u}_k^{(i)})^2 \tag{41}$$

and $$\sigma_{k,2}^{(i)} = Y_{U_k}^{(i)} + (\tilde{u}_k^{(i)})^2 - 2b\tilde{u}_k^{(i)} + b^2. \tag{42}$$

The numerical example in FIG. 3 is obtained with (41) and (42), $p(\tilde{x}_0) = \mathcal{N}(\tilde{x}_0; 0, 0.01)$, $\tilde{e}_k = 0$, and with w=25. Larger values of u, in (38) will yield better approximations of the target $\breve{y}$. However, if w is too large, the computed input signal u may fail to comply with the two-level constraint.

6 Online Operation and Feedback Control 6.1 Online Operation

In many applications, the disclosed method will be used in an online mode as follows. In a first planning period (with planning horizon K), the disclosed method is used to determine an input signal $(u_1, \ldots, u_K)$. However, only an initial segment $(u_1, \ldots, u_r)$ with 0<r<K is actually fed into said analog physical system. In a second planning period, the disclosed method is used to determine an input signal $(u_{r+1}, \ldots, u_{r+K})$, but only $(u_{r+1}, \ldots, u_{2r})$ is actually fed into said analog physical system. An so on: in the n-th planning period, the disclosed method is used to determine an input signal $(u_{(n-1)r+1}, \ldots, u_{(n-1)r+K})$, of which only $(u_{(n-1)r+1}, \ldots, u_{nr})$ is actually fed into said analog physical system.

6.2 Feedback Control

In the online mode of Section 6.1, measurements or additional output signals of said analog physical system, if available, can be used to improve $p(\tilde{x}_0)$ (i.e., the estimate of the initial state $\tilde{x}_0$), for each planning period (as described in Section 5.1, Step (a)) by customary state-tracking methods.

7 Sparse Switching Between Discrete Levels

In many applications, switching the input signal between the allowed discrete levels is costly (e.g., because of thermal losses) and should be done as infrequently as possible.

The disclosed method can handle such situations by an extended system model as follows. For ease of exposition, we will assume a single scalar input signal (i.e., L=1) and a single scalar output (i.e., H=1). First, a state space model representation (with $A_k$, $B_k$, $C_k$ and $D_k$) of the analog physical system is derived. Then, the state space is extended by two states yielding the state space matrices of the extended system model $$\tilde{A}_k = \begin{bmatrix} 0 & 0 & \\ & & 0_{2 \times N} \\ 1 & 0 & \\ \hline 0_{N \times 2} & A_k \end{bmatrix}, \tilde{B}_k = \begin{bmatrix} 1 \\ 0 \\ \hline B_k \end{bmatrix}, \tag{43}$$

$$\tilde{C}_k = \begin{bmatrix} 1 & -1 & 0_N \\ \hline 0_2 & C_k \end{bmatrix}, \tilde{D}_k = \begin{bmatrix} 0_G \\ 0_G \\ \hline D_k \end{bmatrix} \tag{44}$$

derived from $A_k$, $B_k$, $C_k$, and $D_k$, with $\tilde{u}_k = u_k$, $\tilde{e}_k = e_k$, and $\tilde{y}_k = (u_k - u_{k-1}, y_k)$ for $k \in \{1, \ldots, K\}$. By choosing $\tilde{C}_k$ as above, the level differences $u_k - u_{k-1}$ appear as an additional signal component $\tilde{y}_{k,1}$ in the extended system model output signal $\tilde{y}$.

A quadratic penalty on the level differences can be achieved by setting nonzero weights in $W_k$ of the function (7) for the particular output signal component Penalties of other forms can be achieved using the optional factors $\psi_k(\tilde{y}_k, \zeta_k)$ in (8). Said factors $\psi_k(\tilde{y}_k, \zeta_k)$ are proportional to Gaussian probability densities for fixed $\zeta_k$. However, their variances may be unknown and determined in every iteration step. By choosing suitable factors $\psi_k(\tilde{y}_k, \zeta_k)$, the penalty function $$\text{cost}(\tilde{y}_{k,1}) = -\log \max_{\zeta_k} \psi_k(\tilde{y}_{k,1}, \zeta_k) \tag{45}$$

can advantageously represent the absolute value function $|u_k - u_{k-1}|$ the Huber function, or convex-concave functions as described in [12].

Example: Electric Motor Control

For a concrete example, consider a simple model of an electric motor as follows. The model has a scalar input a (the control voltage applied to the motor coil) and a scalar output y (the motor coil current) where the input is assumed to be a discrete-valued signal. Given a desired motor coil current $\breve{y}$ (target trajectory), the goal is to determine a discrete-valued (three level) control voltage a such that the resulting motor coil current approximates the desired motor coil current. The motor coil is assumed to be an ideal inductor modeled by a first order integrator. The discrete-time model of the analog physical system is given by $$A_k = 1, B_k = 1/\alpha, C_k = 1, D_k = 0 \tag{46}$$

for $k \in \{1, \ldots, K\}$ and where a is the inductance of the motor coil. The extended state space matrices (43) and (44) are $$\tilde{A}_k = \begin{bmatrix} 0 & 0 & 0 \\ 1 & 0 & 0 \\ 0 & 0 & 1 \end{bmatrix}, \tilde{B}_k = \begin{bmatrix} 1 \\ 0 \\ 1/\alpha \end{bmatrix}, \tag{47}$$

$$\tilde{C}_k = \begin{bmatrix} 1 & -1 & 0 \\ 0 & 0 & 1 \end{bmatrix}, \tilde{D}_k = \begin{bmatrix} 0 \\ 0 \\ 0 \end{bmatrix}, \tag{48}$$

for $k \in \{1, \ldots, K\}$. The priors $\rho_k(\tilde{u}_k, \theta_k)$ are chosen according to the three-level prior described in Section 4.2 with b=1 and S=[1 1], strongly encouraging the input signal to lie in $\{-1, 0, 1\}$.

The first component of the extended system model target trajectory $\mathring{y}$ is given by $(\mathring{y}_{1,1}, \ldots, \mathring{y}_{K,1}) = (0, \ldots, 0)$, and the second component by $(\mathring{y}_{1,2}, \ldots, \mathring{y}_{K,2}) = \breve{y}$. The function (7) becomes $$p\left(\mathring{y} \mid \tilde{u}, \tilde{x}_0, \tilde{e}, \zeta\right) \propto \exp\left(-\frac{1}{2}\sum_{k=1}^{K}\left(\mathring{y}_k - \tilde{y}_k\right)^T W_k\left(\mathring{y}_k - \tilde{y}_k\right)\right) \quad (49)$$

with diagonal weight matrix $W_k=\text{diag}(w_1, w_2)$, where $w_1>0$ and $w_2>0$ are real weights. This results in a quadratic penalty on the level differences with weight $w_1$ and a quadratic penalty on the approximation error with weight $w_2$.

Figure 7:
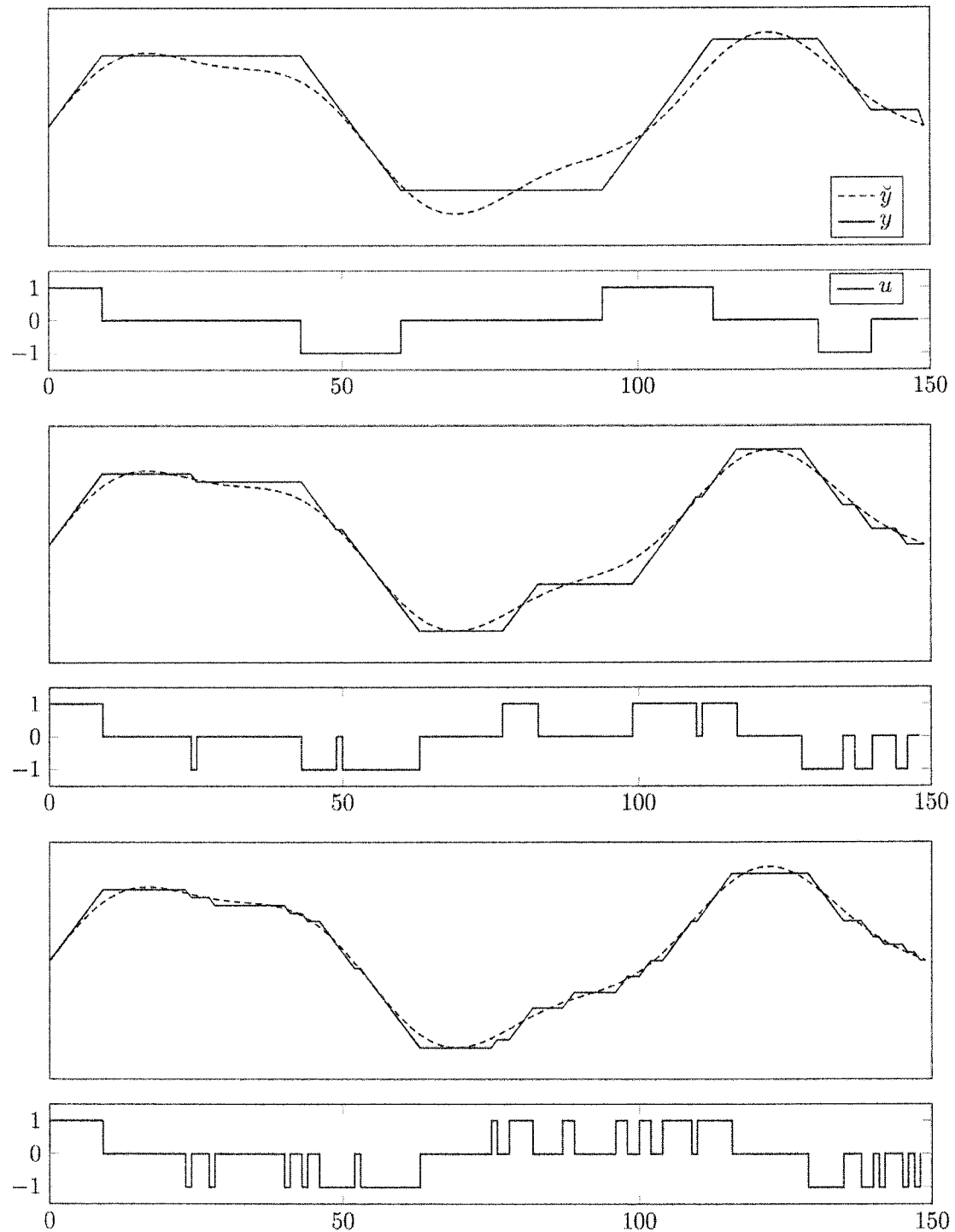
FIG. 7 shows three numerical examples of electric motor control as in Section 7.

The numerical results of FIG. 7 are obtained with $p(\tilde{x}_0) = \mathcal{N}(\tilde{x}_0; 0_3, 0.01 \cdot I_3)$, $\tilde{e}_k=0$, $\alpha=10$ and $K=150$, and with (41) and (42). The experiment was executed three times with different weights $w_1$ and $w_2$.

The desired target motor coil current $\mathring{y}$ is shown in the first plot as dashed line together with the resulting motor coil current y as solid line. The plots below show the determined input signal a as solid line. Three different trade-offs between switching effort and approximation error are shown from top to bottom.

Top: A large $w_1$ leads to few level switches and a small $w_2$ allows large approximation error.

Middle: A Medium $w_1$ and $w_2$ leads to more level switches but a fairly good approximation of $\mathring{y}$.

Bottom: A small $w_1$ and a large $w_2$ leads to many level switches and a precise approximation of $\mathring{y}$.

8 Beyond Quadratic Fitting Cost

For ease of exposition, an extended system model with scalar inputs and outputs (i.e., $\tilde{L}=L=\tilde{H}=H=1$) is assumed for this section.

If the optional factor $\psi(\tilde{y}, \zeta)=1$, the function (7) results in a standard 2-norm penalty on the deviation between the extended system model target trajectory $\mathring{y}$ and extended system model output signal $\tilde{y}$. However, the disclosed method can handle other p-norms with $p \geq 1$, $p \neq 2$ (and essentially also quasi-norms with $0<p<1$) by utilizing the optional factor $\psi(\tilde{y}, \zeta)$ and updating $\zeta$ in every iteration step. The function (7) can be written as $$p\left(\mathring{y} \mid \tilde{u}, \tilde{x}_0, \tilde{e}, \zeta\right) \propto \exp\left(-\frac{1}{2}\sum_{k=1}^{K} w_k\left(\mathring{y}_k - \tilde{y}_k\right)^2\right) \psi(\tilde{y}, \zeta) \quad (50)$$

with scalar weight $w_k$. Choosing $$\psi_k(\tilde{y}_k, \zeta_k) = \sqrt{\frac{2\pi}{w_k}} \exp\left(\frac{-\beta_k^2(2-p)(w_k)^{\frac{-p}{2-p}}}{2p}\right) \quad (51)$$

yields $$p\left(\mathring{y} \mid \tilde{u}, \tilde{x}_0, \tilde{e}, \zeta\right) \propto \exp\left(-\frac{1}{2}\sum_{k=1}^{K} w_k\left(\mathring{y}_k - \tilde{y}_k\right)^2\right) \exp\left(\frac{-\beta_k^2(2-p)(w_k)^{\frac{-p}{2-p}}}{2p}\right) \quad (52)$$

where the weights $w_k$ are determined by $\zeta_k$ and $\beta_k$ is a constant scale factor depending on the initial weight $w_k$, and is defined by $$\beta_k = \left(\frac{pw_k}{2}\right)^{\frac{1}{2-p}}. \quad (53)$$

The optional parameters are determined in every iteration I by $$\zeta_k^{(i)} = \omega_k^{(i)} = \left|\frac{\mathring{y}_k - \tilde{y}_k^{(i)}}{\beta_k}\right|^{p-2} \quad (54)$$

for $k \in \{1, \ldots, K\}$.

As denoted above, $\beta_k$ is a constant scale factor, precalculated before the first iteration and not updated during the iterations.

The utilization of the optional factor $\psi(\tilde{y}, \zeta)$ results in the following cost term $$\text{cost}(\mathring{y} - \tilde{y}) = -\text{logmax}_{\zeta} p\left(\mathring{y} \mid \tilde{u}, \tilde{x}_0, \tilde{e}, \zeta\right) \quad (55)$$

$$= \frac{1}{2}\sum_{k=1}^{K} \omega_k \left|\mathring{y}_k - \tilde{y}_k\right|^p. \quad (56)$$

Example: Absolute-Value Penalty

An absolute value penalty (i.e., p=1) is achieved by choosing $$\psi(\tilde{y}_k, \zeta_k) = \sqrt{\frac{2\pi}{\omega_k}} \exp\left(\frac{-\beta_k^2}{2\omega_k}\right) \quad (57)$$

with $\zeta_k=w_k$ an $\beta_k=w_k/2$.

9 Soft Box Constraint

For ease of exposition, an extended system model with scalar inputs and outputs (i.e., $\tilde{L}=L=\tilde{H}=H=1$) is assumed for this section.

If the optional factor $\psi(\tilde{y}, \zeta)=1$, the function (7) results in a standard 2-norm penalty on the deviation between the extended system model target trajectory $\mathring{y}$ and extended system model output signal $\tilde{y}$. However, the disclosed method may also be used to enforce $\tilde{y}$ to lie within fixed bounds by utilizing the optional factor $\psi(\tilde{y}, \zeta)$ and updating $\zeta$ in every iteration step. Specifically, the method may be used to enforce $$\mathring{y}_k \leq \tilde{y}_k \leq \mathring{y}_k + \eta_k, \, k \in \{1, \ldots, K\}, \quad (58)$$

where $\mathring{y}_k$ and $\mathring{y}_k + \eta_k$ set the lower and upper bounds of the box constraint at time k, respectively. The function (7) can be written as $$p\left(\mathring{y} \mid \tilde{u}, \tilde{x}_0, \tilde{e}, \zeta\right) \propto \exp\left(-\frac{1}{2}\sum_{k=1}^{K} \omega_k\left(\mathring{y}_k - \tilde{y}_k\right)^2\right) \psi(\tilde{y}, \zeta) \quad (59)$$

with scalar weight $w_k$. In order to achieve (58), we choose $$\psi_k(\tilde{y}_k, \zeta_k) = \sqrt{\frac{2\pi}{\omega_k}} \exp\left(-\frac{\gamma^2}{2\omega_k}\right) \exp\left(-\frac{1}{2}\omega_k'\left(\mathring{y}_k + \eta_k - \tilde{y}_k\right)^2\right) \exp\left(-\frac{\gamma^2}{2\omega_k'}\right) \quad (60)$$

with auxiliary weight $w_k'$ yielding $$p\left(\mathring{y} \mid \tilde{u}, \tilde{x}_0, \tilde{e}, \zeta\right) \propto \exp\left(-\frac{1}{2}\sum_{k=1}^{K} \omega_k\left(\mathring{y}_k - \tilde{y}_k\right)^2\right) \quad (61)$$

-continued $$\exp\left(-\frac{1}{2}\sum_{k=1}^{K}\omega_k'\left(\mathring{y}_k+\eta_k-\tilde{y}_k\right)^2\right)\cdot\exp\left(-\frac{1}{2}\sum_{k=1}^{K}\frac{\gamma^2}{2\omega_k}\right)\exp\left(-\frac{1}{2}\sum_{k=1}^{K}\frac{\gamma^2}{2\omega_k'}\right),$$

where the weights $w_k$ and $w_k'$, are determined by $\zeta_k$ and where $\gamma$ is a constant scale factor.

The optional parameters are determined in every iteration i by $$\zeta_k^{(i)} = (\omega_k^{(i)}, \omega_k'^{(i)}) = \left(\left|\frac{\gamma}{\mathring{y}_k-\tilde{y}_k^{(i)}}\right|, \left|\frac{\gamma}{\mathring{y}_k+\eta_k-\tilde{y}_k^{(i)}}\right|\right) \quad (62)$$

for $k \in \{1, \ldots, K\}$.

The utilization of the optional factor $\psi(\tilde{y}, \zeta)$ results in the following cost term for (59)

$$\mathrm{cost}(\tilde{y}) = -\log\max_{\zeta} p\left(\mathring{y}\,\big|\,\tilde{u}, \tilde{x}_0, \tilde{e}, \zeta\right) \quad (63)$$

$$= \gamma\sum_{k=1}^{K}\left|\mathring{y}_k-\tilde{y}_k\right|+\left|\mathring{y}_k+\eta_k-\tilde{y}_k\right|, \quad (64)$$

where (64) is constant for $\tilde{y}_k$ in the interval $[\mathring{y}_k, \mathring{y}_k+\eta_k]$, and rises with slope $2\gamma$ outside of $[\mathring{y}_k, \mathring{y}_k+\eta_k]$. The constraint (58) may be applied to any output of the extended system model, i.e., to any linear function of the state $\tilde{x}_k$ (including also inputs).

Example: Steering Object Through Tunnel

For a concrete example, consider a control problem wherein the analog physical system is a third order integrator chain. The task is to determine a discrete-valued (seven level) control input u to the analog physical system such that the resulting output trajectory y lies between $\mathring{y}$ and $\mathring{y}+\eta$, with $\eta=(\eta_1, \ldots, \eta_K) \in \mathbb{R}^K$.

The discrete-time model of the analog physical system is given by $$A_k = \begin{bmatrix} 1 & 0 & 0 \\ 1 & 1 & 0 \\ 1/2 & 1 & 1 \end{bmatrix}, B_k = 0.0015 \cdot \begin{bmatrix} 1 \\ 1/2 \\ 1/6 \end{bmatrix}, \quad (65)$$

$$C_k = [0\ 0\ 1], D_k = \begin{bmatrix} 0 \\ 0 \\ 0 \end{bmatrix}, \quad (66)$$

for $k \in \{1, \ldots, K\}$. The state space matrices of the extended system model are trivially given by $\tilde{A}_k=A_k$, $\tilde{B}_k=B_k$, $\tilde{C}_k=C_k$ and $\tilde{D}_k=D_k$, and thus $\tilde{y}=y$ and $\mathring{y}=\mathring{y}$.

The priors $\rho_k(\tilde{u}_k, \theta_k)$ are chosen according to the M-level prior described in Section 4.4 with $\tilde{L}=6$, $J_{\tilde{\ell}}=2$, for all $\tilde{\ell} \in \{1, \ldots, \tilde{L}\}$, $(m_{1,1}, m_{1,2}, \ldots, m_{6,2})=(0, 1, 0, 1, 0, 1, 0, -1, 0, -1, 0, -1)$, and $S=[1\ 1\ 1\ 1\ 1\ 1]$, strongly encouraging the input signal to lie in $\{-3, -2, -1, 0, 1, 2, 3\}$.

Figure 8:
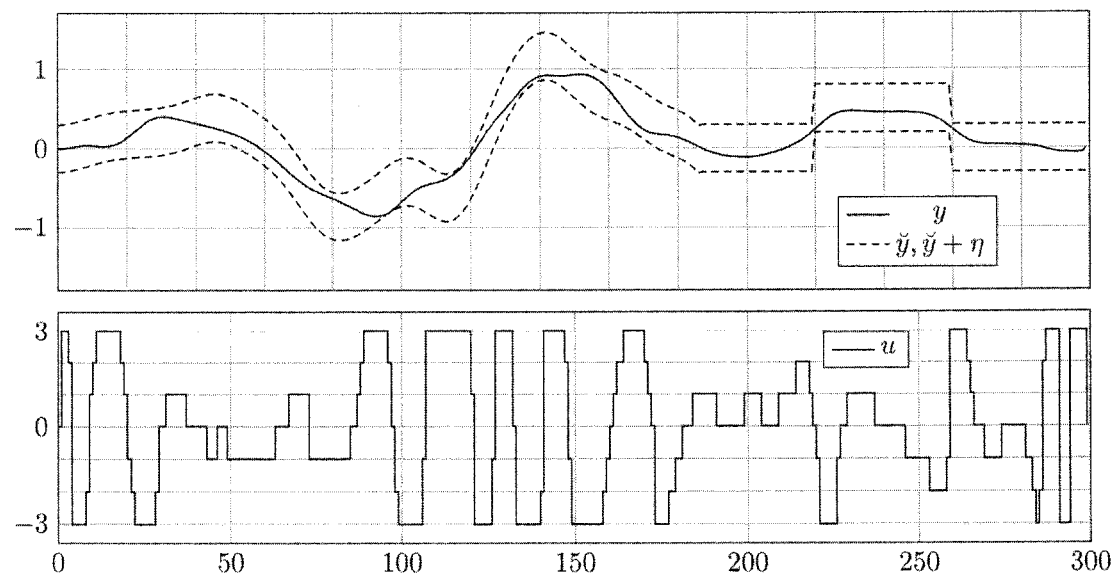
FIG. 8 shows a numerical example of box-constrained trajectory planning as in Section 9.

The numerical results of FIG. 8 are obtained with $p(\tilde{x}_0)=\mathcal{N}(\tilde{x}_0; 0_3, 0.01\cdot I_3)$, $\tilde{e}_k=0$, $\gamma=20$ and $K=300$, and with (41), (42) and (62).

The desired bounds $\mathring{y}$ and $\mathring{y}+\eta$ are shown in the first plot as dashed line together with the resulting output trajectory y as solid line. The plot below shows the determined discrete-value control signal u as solid line.

10 Further Examples

In the following sections, we describe further embodiments of the invention.

10.1 Multiple Discrete Inputs and Multiple Outputs

In the previous examples, the analog physical system had a single input (i.e., L=1) and a single output (H=1). However, the disclosed method can handle multiple inputs and outputs.

Example: MIMO Motor Control

This example generalizes the example of Section 7 to multiple inputs and outputs. Specifically, the motor in this example is composed of three motor coils which are controlled independently. As a consequence, L=3 and H=3. The input signal u of the analog physical system consists of three components $(u_{1,1}, \ldots, u_{K,1})$, $(u_{1,2}, \ldots, u_{K,2})$ and $(u_{1,3}, \ldots, u_{K,3})$ describing the discrete-valued control voltages for the three motor coils. Analogously, the model output y contains three signal components describing the three motor coil currents as well as the target trajectory $\mathring{y}$ contains three signal components, describing the three desired motor coil currents.

The three motor coils of the analog physical system are modeled by three first-order integrators, yielding the following state space representation $$A_k = \begin{bmatrix} 1 & 0 & 0 \\ 0 & 1 & 0 \\ 0 & 0 & 1 \end{bmatrix}, \quad (67)$$

$$B_k = 1/a\begin{bmatrix} 1 & 0 & 0 \\ 0 & 1 & 0 \\ 0 & 0 & 1 \end{bmatrix},$$

$$C_k = \begin{bmatrix} 1 & 0 & 0 \\ 0 & 1 & 0 \\ 0 & 0 & 1 \end{bmatrix},$$

$$D_k = \begin{bmatrix} 0 \\ 0 \\ 0 \end{bmatrix}$$

with inductance a for $k \in \{1, \ldots, K\}$.

The states of the system are fully decoupled. Coupling between the states could easily be incorporated by populating the non-diagonal entries of $A_k$. The state space matrices of the extended system model are trivially given by $\tilde{A}_k=A_k$, $\tilde{B}_k=B_k$, $\tilde{C}_k=C_k$ and $\tilde{D}_k=D_k$.

The prior $\rho_k(\tilde{u}_k, \theta_A)$ is a product of multiple three-level priors, i.e., $$\rho_k(\tilde{u}_k, \theta_k) = \rho_k(\tilde{u}_{k,1}, \tilde{u}_{k,2}, \tilde{u}_{k,3}, \tilde{u}_{k,4}, \tilde{u}_{k,5}, \tilde{u}_{k,6}, \theta_k) \quad (68)$$

$$= \rho_{k,1}(\tilde{u}_{k,1}, \tilde{u}_{k,2}, \theta_{k,1})\rho_{k,2}(\tilde{u}_{k,3}, \tilde{u}_{k,4}, \theta_{k,2})\rho_{k,3}(\tilde{u}_{k,5}, \tilde{u}_{k,6}, \theta_{k,3}) \quad (69)$$

with $\theta_k=(\theta_{k,1}, \theta_{k,2}, \theta_{k,3})$, and where each factor in (69) is chosen according to the three-level prior described in Section 4.2 with b=1. The parameter $\theta_k$ comprises all variances of (24). The matrix S is chosen to be $$S = \begin{bmatrix} 1 & 1 & 0 & 0 & 0 & 0 \\ 0 & 0 & 1 & 1 & 0 & 0 \\ 0 & 0 & 0 & 0 & 1 & 1 \end{bmatrix} \quad (70)$$

with $\tilde{L}=6$ yielding $$u_{k,1} = \tilde{u}_{k,1} + \tilde{u}_{k,2} \quad (71)$$

$$u_{k,2} = \tilde{u}_{k,3} + \tilde{u}_{k,4} \quad (72)$$

$$u_{k,3} = \tilde{u}_{k,5} + \tilde{u}_{k,6} \quad (73)$$

The function (7) amounts to $$p\left(\mathring{y} \mid \tilde{u}, \tilde{x}_0, \tilde{e}, \zeta\right) \propto \exp\left(-\frac{1}{2}\sum_{k=1}^{K}\left(\mathring{y}_k - \tilde{y}_k\right)^{\top} W_k\left(\mathring{y}_k - \tilde{y}_k\right)\right) \quad (74)$$

with weight matrix $W_k = wI_3$ and $\mathring{y} = \breve{y}$.

Figure 9:
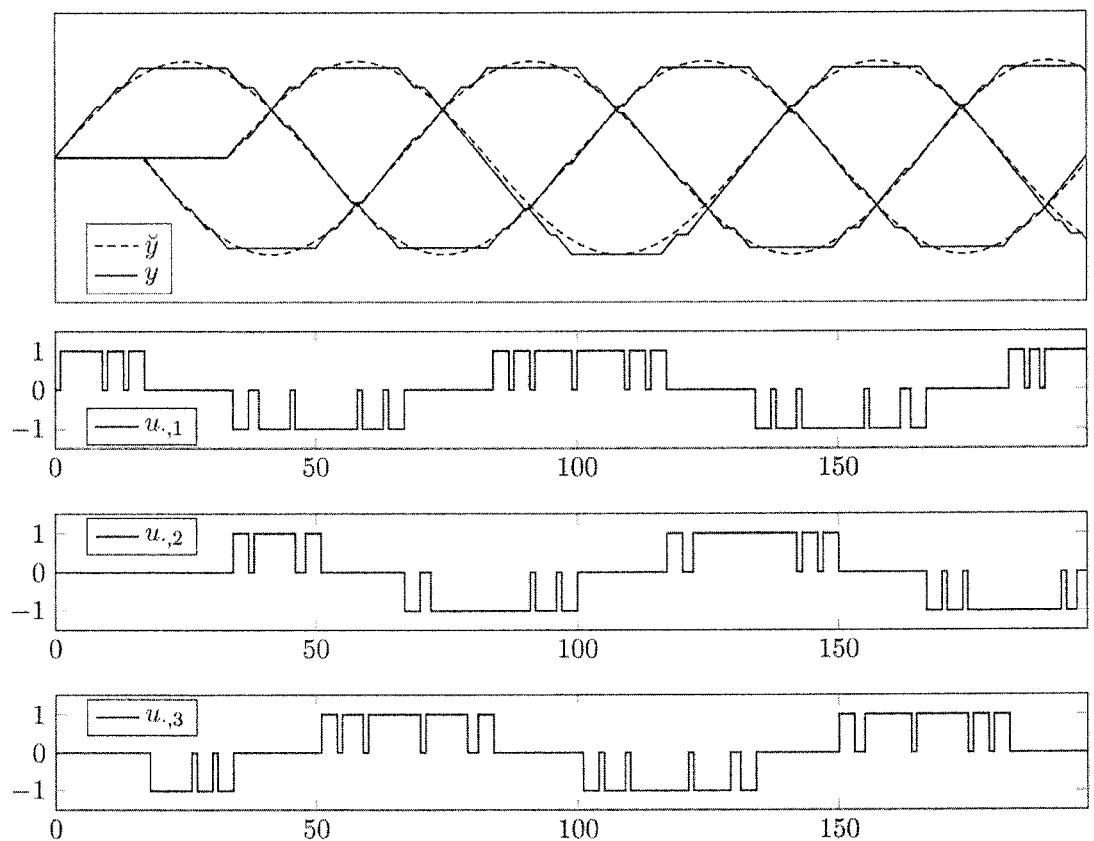
FIG. 9 shows a numerical example of MIMO electric motor control as in Section 10.1.

The numerical results of FIG. 9 are obtained with $p(\tilde{x}_0) = \mathcal{N}(\tilde{x}_0; 0_3, 0.01 \cdot I_3)$, $\tilde{e}_k = 0$, $w=5$, $\alpha=5$ and $K=200$, and with (41) and (42). The desired motor coil currents $\breve{y}$ are shown in the first plot together with the resulting motor coil currents y as solid line. The plots below show the determined input signals components of u as solid lines.

10.2 Trajectory Planning with Sparse Checkpoints

In the previous examples, the weight matrix $W_k$ in (7) did not depend on the time index k. However, time-dependent weights can be useful. For example, consider a situation where the target trajectory $\breve{y}$ consists of sparse checkpoints at times $k_1, k_2, \ldots \subset \{1, \ldots, K\}$, with no constraints between these checkpoints. This situation can be handled by choosing $W_k = 0_{\tilde{H} \times \tilde{H}}$ for $k \notin \{k_1, k_2, \ldots\}$.

Example: Flappy Bird

Figure 10:
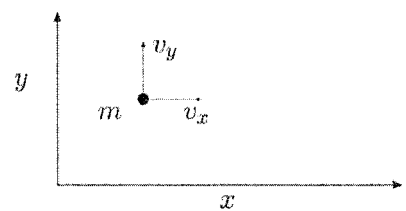
FIG. 10 shows a diagram illustrating the dynamical system of Section 0.1.0.2.

In this example, the analog physical system consists of a point of mass m moving on a xy-plane, as depicted in FIG. 10. The horizontal velocity $v_x$ is constant and not of particular interest (and not part of the system model). The vertical velocity $v_y$ is influenced by a constant gravitational acceleration g, pulling the point mass downwards. Any input fed to said system modifies its total impulse in y-direction and thus its vertical velocity.

The analog physical system is modeled by a linear state space model with two-dimensional input u (i.e., L=2) and scalar output y (i.e., H=1) according to $$A_k = \begin{bmatrix} 1 & T \\ 0 & 1 \end{bmatrix}, B_k = \begin{bmatrix} 0 & 0 \\ 1/m & 1 \end{bmatrix}, \quad (75)$$

$$C_k = [1 \ 0], D_k = \begin{bmatrix} 0 \\ 0 \end{bmatrix} \quad (76)$$

for $k \in \{1, \ldots, K\}$ where T is the time constant of the discretization. The extended system model is given by $\tilde{A}_k = A_k$, $\tilde{B}_k = B_k$, $\tilde{C}_k = C_k$, $\tilde{D}_k = D_k$, and $$S = I_{2\times 2} \quad (77)$$

The extended input $\tilde{u}$ (and also u) comprises of two input components, i.e., $\tilde{L}=2$. The component $(\tilde{u}_{1,1}, \ldots, \tilde{u}_{K,1})$ is a two-level control input and its corresponding prior $\rho_k(\tilde{u}_{k,1}, \theta_k)$, $k \in \{1, \ldots, K\}$, is chosen according to Section 4.1 with a=0 and b=1. The component $(\tilde{u}_{1,2}, \ldots, \tilde{u}_{K,2})$ is a constant input accounting for the gravitational pull and is defined as $\tilde{u}_{k,2} = -Tg$ for all $k \in \{1, \ldots, K\}$. The combined prior amounts to $$\rho_k(\tilde{u}_k, \theta_k) = \rho_k(u_{k,1}, \theta_k) \delta(\tilde{u}_{k,2} + Tg) \quad (78)$$

for $k \in \{1, \ldots, K\}$ where $\delta(\cdot)$ is the Dirac delta.

The function (7) is given by $$p\left(\mathring{y} \mid \tilde{u}, \tilde{x}_0, \tilde{e}, \zeta\right) \propto \exp\left(-\frac{1}{2}\sum_{k=1}^{K} w_k\left(\mathring{y}_k, \tilde{y}_k\right)^2\right) \quad (79)$$

with weights $$w_k = \begin{cases} 10, & k \in \{60, 120, 180, 240\} \\ 0, & \text{else} \end{cases}, k \in \{1, \ldots, K\} \quad (80)$$

with $k \in \{60, 120, 180, 240\}$ representing the time instances of the prescribed checkpoints. The goal is to determine a binary input signal $(u_{1,1}, \ldots, u_{K,1})$ for said model such that the moving point mass passes through the checkpoints as closely as possible.

Figure 11:
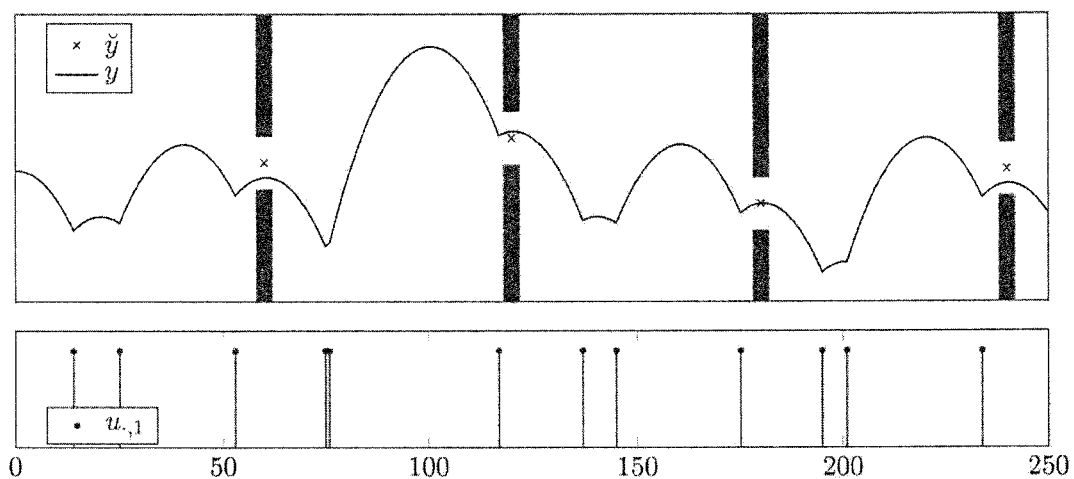
FIG. 11 shows a numerical example of trajectory planning as in Section 10.2.

The numerical results of FIG. 11 are obtained with $p(\tilde{x}_0) = \mathcal{N}(\tilde{x}_0; 0_2, 0.01 \cdot I_2)$, $\tilde{e}_k = 0$, T=0.1, m=1, g=0.25 and K=250, and with (41) and (42).

The four checkpoints at time instances $k \in \{60, 120, 180, 240\}$ are illustrated by black crosses in the first plot. The determined input signal $(u_{1,1}, \ldots, u_{K,1})$ is indicated by stems in the second plot. The resulting output trajectory y is depicted as solid line in the first plot. As can be seen, the output trajectory y is an admissible trajectory and does not collide with any of the obstacles.

Notes

While there are shown and described presently preferred embodiment of the invention, it is to be distinctly understood that the invention is not limited thereto but may be otherwise variously embodied and practiced within the scope of the following claims.

REFERENCES

[1] A. H. Land and A. G. Doig, "An automatic method for solving discrete programming problems," *ECONOMETRICA*, vol. 28, no. 3, pp. 497-520, 1960.

[2] J. Richalet, A. Rault, J. Testud, and J. Papon, "Model predictive heuristic control," *Automatica (Journal of IFAC)*, vol. 14, no. 5, pp. 413-428, 1978.

[3] T. Geyer, *Model Predictive Control of High Power Converters and Industrial Drives*, pp. 3-23. John Wiley & Sons, 2016.

[4] P. Karamanakos, T. Geyer, N. Oikonomou, F. Kieferndorf, and S. Manias, "Model predictive control in power electronics: Strategies to reduce the computational complexity," in *IECON 2013-39th Annual Conference of the IEEE Industrial Electronics Society*, pp. 5818-5823, IEEE, 2013.

[5] Y. Zhang, W. Xie, Z. Li, and Y. Zhang, "Model predictive direct power control of a PWM rectifier with duty cycle optimization," *IEEE Transactions on Power Electronics*, vol. 28, no. 11, pp. 5343-5351, 2013.

[6] M. E. Tipping, "Sparse Bayesian learning and the relevance vector machine," *Journal of Machine Learning Research*, vol. 1, no. June, pp. 211-244, 2001.

[7] M. E. Tipping, A. Faul, and J. J. T. Avenue, "Fast marginal likelihood maximisation for sparse Bayesian models," in *Proceedings of the Ninth international Workshop on Artificial Intelligence and Statistics*, pp. 3-6,2003.

[8] D. P. Wipf and B. D. Rao, "Sparse Bayesian learning for basis selection," *IEEE Transactions on Signal Processing*, vol. 52, no. 8, pp. 2153-2164, 2004.

[9] D. P. Wipf and S. S. Nagarajan, "A new view of automatic relevance determination," in *Advances in Neural Information Processing Systems*, pp. 1625-1632, 2008.

[10] J. Palmer, K. Kreutz-Delgado, D. Wipf, and B. Rao, "Variational representations of non-Gaussian priors," *UCSD*, San Diego, 2005.

[11] J. Palmer, K. Kreutz-Delgado, B. D. Rao, and D. P. Wipf, "Variational EM algorithms for non-Gaussian latent variable models," in *Advances in Neural Information Processing Systems*, pp. 1059-1066, 2006.

[12] H.-A. Loeliger, B. Ma, H. Malmberg, and F. Wadehn, "Factor graphs with NUV priors and iteratively reweighted descent for sparse least squares and more," in 2018 *IEEE 10th International Symposium on Turbo Codes & Iterative Information Processing (ISTC)*, pp. 1-5, IEEE, 2018.

[13] R. P. Sallen and E. L. Key, "A practical method of designing RC active filters," *IRE Transactions on Circuit Theory*, vol. 2, no. 1, pp. 74-85, 1955.

[14] H.-A. Loeliger, L. Bruderer, H. Malmberg, F. Wadehn, and N. Zalmai, "On sparsity by NUV-EM, Gaussian message passing, and Kalman smoothing," in 2016 *Information Theory and Applications Workshop (ITA)*, pp. 1-10, La Jolla, CA, 2016.

The invention claimed is:

1. A method for controlling an analog physical system with input signal $u=(u_1, \ldots, u_K)$ to follow a given target trajectory $\mathring{y}=(\mathring{y}_1, \ldots, \mathring{y}_K)$, wherein at least one component ($u_{1,\ell} \ldots, u_{K,\ell}$) of said input signal is discrete-valued with M levels, $M \in \{2, 3, \ldots\}$, wherein
   $u_k=(u_{k,1}, \ldots, u_{k,L}) \in \mathbb{R}^L$ is the input signal of the analog physical system at time $k \in \{1, \ldots, K\}$,
   $K \in \mathbb{N}$ is a planning horizon,
   L is the number of input signal components,
   $\ell$ (with $1 \ll \ell \leq L$) is the index of said discrete-valued component of u,
   $\mathring{y}_k = (\mathring{k}_{k,1}, \ldots, \mathring{k}_{k,H}) \in \mathbb{R}^H$ is the given target trajectory at time k,
   H is the number of components of the target trajectory, wherein said method uses an extended system model with output signal $\tilde{y}=(\tilde{y}_1, \ldots, \tilde{y}_K)$, $\tilde{y}_k \in \mathbb{R}^{\tilde{H}}$ for some $\tilde{H} \geq H$, and with input signal $\tilde{u}=(\tilde{u}_1, \ldots, \tilde{u}_K)$, $\tilde{u}_k \in \mathbb{R}^{\tilde{L}}$ for some $\tilde{L} \geq L$, such that $$u_k = S\tilde{u}_k \quad (81)$$

for some matrix S and all $k \in \{1, \ldots, K\}$, and with time-dependent parameters $\theta=(\theta_1, \ldots, \theta_K)$ and optional additional parameters $\zeta=(\zeta_1, \ldots, \zeta_K)$, wherein $\tilde{u}=(\tilde{u}_1, \ldots, \tilde{u}_K)$ is determined by iteratively executing, in iterations $i=1, 2, 3, \ldots$,
wherein said method comprises the steps, performed by a control unit, of
   (a) executing a maximization step in said extended system model with parameters $\theta$ fixed to $\theta^{(i-1)}$ and $\zeta$ fixed to $\zeta^{(i-1)}$, thereby obtaining a candidate input signal ($\tilde{u}_1^{(i)}, \ldots, \tilde{u}_K^{(i)}$) with optional precision information ($V_{\tilde{U}_1}^{(i)}, \ldots, V_{\tilde{U}_K}^{(i)}$), and an output signal ($\tilde{y}_1^{(i)}, \ldots, \tilde{y}_K^{(i)}$), with optional precision information ($V_{\tilde{Y}_1}^{(i)}, \ldots, V_{\tilde{Y}_K}^{(i)}$), and
   (b) determining new parameters $\theta^{(i)}=(\theta_1^{(i)}, \ldots, \theta_K^{(i)})$ and optionally $\zeta^{(i)}=(\zeta_1^{(i)}, \ldots, \zeta_K^{(i)})$, where $\zeta_k^{(i)}$ is a function of $\tilde{u}_k^{(i)}$ and $V_{\tilde{U}_k}^{(i)}$, and $\zeta_k^{(i)}$ is a function of $\tilde{y}_k^{(i)}$ and $V_{\tilde{Y}_k}^{(i)}$, as computed in Step (a),
and wherein said extended system model can be expressed as $$p(\tilde{u},\mathring{y},\tilde{x}_0,\tilde{e}|\theta,\zeta) \propto p(\mathring{y}|\tilde{u},\tilde{x}_0,\tilde{e},\zeta)\rho(\tilde{u},\theta)p(\tilde{x}_0)p(\tilde{e}) \quad (82)$$

wherein
   $p(\tilde{u},\mathring{y},\tilde{x}_0,\tilde{e}|\theta,\zeta)$ is a probability density function in $\tilde{u}, \mathring{y}, \tilde{x}_0$ and $\tilde{e}$ with parameters $\theta$ and $\zeta$,
   $\mathring{y}=(\mathring{y}_1, \ldots, \mathring{y}_K)$, $\mathring{y}_k \in \mathbb{R}^{\mathring{H}}$, is the target trajectory of said extended system model comprising $\mathring{y}$ and optionally additional trajectories,
   "$\propto$" denotes equality up to a scale factor,
   said analog physical system is modeled by a discrete-time linear state space model with recursions $$x_k = A_k x_{k-1} + B_k u_k + D_k e_k \quad (83)$$

$$y_k = C_k x_k \quad (84)$$

for $k \in \{1, \ldots, K\}$, and with state vector $x_k \in \mathbb{R}^N$, initial state $x_0$, noise $e_k \in \mathbb{R}^G$, model output $y_k \in \mathbb{R}^H$, and matrices $A_k, B_k, C_k, D_k$,
said method uses an extended version of model of eq. 83 and eq. 84 which is given by the state space recursions $$\tilde{x}_k = \tilde{A}_k \tilde{x}_{k-1} + \tilde{B}_k S \tilde{u}_k + \tilde{D}_k \tilde{e}_k \quad (85)$$

$$\tilde{y}_k = \tilde{C}_k \tilde{x}_k \quad (86)$$

for $k \in \{1, \ldots, K\}$, and with state vector $\tilde{x}_k \in \mathbb{R}^{\tilde{N}}$ with $\tilde{N} \geq N$, initial state $\tilde{x}_0$, noise $\tilde{e}_k \in \mathbb{R}^{\tilde{G}}$ with $\tilde{G} \geq G$, and wherein the matrices $\tilde{A}_k, \tilde{B}_k, \tilde{C}_k$ and $\tilde{D}_k$ are derived from $A_k, B_k, C_k$ and $D_k$,
$p(\mathring{y}|\tilde{u},\tilde{x}_0,\tilde{e},\zeta)$ is given by $$p\left(\mathring{y} \mid \tilde{u}, \tilde{x}_0, \tilde{e}, \zeta\right) \propto \exp\left(-\frac{1}{2}\sum_{k=1}^{K} w_k \left(\mathring{y}_k - \tilde{y}_k\right)^T W_k \left(\mathring{y}_k - \tilde{y}_k\right)\right) \psi(\tilde{y}, \zeta) \quad (87)$$

where $W_k$ is a real non-negative weight matrix and where $\tilde{y}_k$ is the extended system model output signal determined by eq. 85 and eq. 86,
$\psi(\tilde{y},\zeta)$ is an optional factor in eq. 87, which means it is either 1, or if present, it may take the form $$\psi(\tilde{y}, \zeta) = \prod_{k=1}^{K} \psi_k(\tilde{y}_k, \zeta_k) \quad (88)$$

such that, for fixed $\zeta_k$, $\psi_k(\tilde{y}_k,\zeta_k)$ is a Gaussian probability density function in $\tilde{y}_k$, up to a scale factor,
$p(\tilde{x}_0)$ is a Gaussian probability density,
$p(\tilde{e})$ factors as $$p(\tilde{e}) = \prod_{k=1}^{K} p(\tilde{e}_k) \quad (89)$$

where each $p(\tilde{e}_k)$ is a Gaussian probability density,
$\rho(\tilde{u},\theta)$ factors as $$\rho(\tilde{u}, \theta) = \prod_{k=1}^{K} \rho_k(\tilde{u}_k, \theta_k) \quad (90)$$

such that,
   for fixed $\theta_k$, $\rho_k(\tilde{u}_k,\theta_k)$ is a Gaussian probability density function in $\tilde{u}_k$, up to a scale factor, and
   for at least one index $\tilde{l} \in \{1, \ldots, \tilde{L}\}$, $\rho_k(\tilde{u}_k,\theta_k)$ contains as a factor the product $$\mathcal{N}(\tilde{u}_{k,\tilde{l}}; m_1, \sigma_{k,1}^2) \ldots \mathcal{N}(\tilde{u}_{k,\tilde{l}}; m_J, \sigma_{k,J}^2) \quad (91)$$

of $J \geq 2$ Gaussian probability density functions with different means $m_1, \ldots, m_J$ and with variances $\sigma_{k,1}^2, \ldots, \sigma_{k,J}^2$ determined by $\theta_k$.

2. The method of claim 1 wherein, in Step (a), the candidate input signal $(\tilde{u}_1^{(i)}, \ldots, \tilde{u}_K^{(i)})$ is the mean of the posterior distribution $p(\tilde{u}|\mathring{y}, \theta^{(i-1)}, \zeta^{(i-1)})$.

3. The method of claim 1 wherein, in Step (a), the output signal $(\tilde{y}_1^{(i)}, \ldots, \tilde{y}_K^{(i)})$ is the mean of the posterior distribution $p(\tilde{y}|\mathring{y}, \theta^{(i-1)}, \zeta^{(i-1)})$.

4. The method of claim 1 wherein, in Step (a), the precision information $V_{U_k}^{(i)}$, $k \in \{1, \ldots, K\}$, comprises the posterior variances of $p(\tilde{u}_{k,\tilde{l}}|\mathring{y}, \theta^{(i-1)}, \zeta^{(i-1)})$, wherein $\tilde{l} \in \{1, \ldots, \tilde{L}\}$ indicates a discrete-valued component of $\tilde{u}_k$.

5. The method of claim 1 wherein, in Step (a), the precision information $V_{Y_k}^{(i)}$, $k \in \{1, \ldots, K\}$, comprises the posterior variances of $p(\tilde{y}_{k,\tilde{h}}|\mathring{y}, \theta^{(i-1)}, \zeta^{(i-1)})$ for all $\tilde{h} \in \{1, \ldots, \tilde{H}\}$.

6. The method of claim 1 wherein, in Step (b), the new parameters $\theta_k^{(i)}$ are determined by $$\theta_k^{(i)} = \underset{\theta_k}{\operatorname{argmax}} \; \rho_k(\tilde{u}_k^{(i)}, \theta_k) \tag{92}$$

for $k \in \{1, \ldots, K\}$.

7. The method of claim 1 wherein, in Step (b), the new parameters $\theta_k^{(i)}$ are determined by $$\theta_k^{(i)} = \underset{\theta_k}{\operatorname{argmax}} \; E[\log \rho_k(\tilde{U}_k, \theta_k)] \tag{93}$$

for $k \in \{1, \ldots, K\}$ and where the expectation $E[\cdot]$ is with respect to $p(\tilde{u}_k|\mathring{y}, \theta^{(i-1)}, \zeta^{(i-1)})$.

8. The method of claim 1 wherein $$\rho_k(\tilde{u}_k, \theta_k) = \mathcal{N}(\tilde{u}_k; a, \sigma_{k,1}^2) \mathcal{N}(\tilde{u}_k; b, \sigma_{k,2}^2) \tag{94}$$

where $\theta_k = (\sigma_{k,1}^2, \sigma_{k,2}^2)$, $S=1$, $\tilde{L}=L=1$ and with the two levels $a \in \mathbb{R}$ and $b \in \mathbb{R}$.

9. The method of claim 1 wherein $$\rho_k(\tilde{u}_k, \theta_k) = \rho_k(\tilde{u}_{k,1}, \tilde{u}_{k,2}, \theta_k) \tag{95}$$

with $$\rho_k(\tilde{u}_{k,1}, \tilde{u}_{k,2}, \theta_k) = \mathcal{N}(\tilde{u}_{k,1}; 0, \sigma_{k,1,1}^2) \mathcal{N}(\tilde{u}_{k,1}; b, \sigma_{k,1,2}^2) \cdot \mathcal{N}(\tilde{u}_{k,2}; 0, \sigma_{k,2,1}^2) \mathcal{N}(\tilde{u}_{k,2}; -b, \sigma_{k,2,2}^2) \tag{96}$$

where $\theta_k = (\sigma_{k,1,1}^2, \sigma_{k,1,2}^2, \sigma_{k,2,1}^2, \sigma_{k,2,2}^2)$, $S=[1\;1]$, $L=2$, $\tilde{L}=1$ and $b \in \mathbb{R}$.

10. The method of claim 1 wherein a preference for sparsity in the number of level switches in at least one of the discrete valued input signal components $(u_{1,l}, \ldots, u_{K,l})$ is achieved by utilizing extended state space matrices $\tilde{A}_k$, $\tilde{B}_k$, $\tilde{C}_k$ and $\tilde{D}_k$, such that said level switches appear as an additional output signal component $(\tilde{y}_{1,\tilde{h}}, \ldots, \tilde{y}_{K,\tilde{h}})$ with $$\tilde{y}_{k,\tilde{h}} = u_{k,l} - u_{k-1,l} \tag{97}$$

for at least one $\tilde{h} \in \{1, \ldots, \tilde{H}\}$.

11. The method of claim 1 wherein $W_k \neq 0_{\tilde{H} \times \tilde{H}}$ for several $k \in \{k_1, k_2, \ldots\} \subset \{1, \ldots, K\}$ and $W_k = 0_{\tilde{H} \times \tilde{H}}$ otherwise.

12. The method of claim 1 wherein eq. 87 is $$p(\mathring{y}|\tilde{u}, \mathring{x}_0, \tilde{e}, \zeta) \propto \tag{98}$$

$$\exp\left(-\frac{1}{2}\sum_{k=1}^{K} w_k (\mathring{y}_k - \tilde{y}_k)^T W_k (\mathring{y}_k - \tilde{y}_k)\right) \exp\left(\frac{-\beta_{k,\tilde{h}}^2 (2-p)(w_{k,\tilde{h}})^{\frac{-p}{2-p}}}{2p}\right)$$

wherein $W_k = \operatorname{diag}(w_{k,1}, \ldots, w_{k,\tilde{H}})$, $\beta_{k,\tilde{h}}$ is a constant scale factor, depends on the initial weight $w_{k,\tilde{h}}$, and is defined by $$\beta_{k,\tilde{h}} = \left(\frac{p w_{k,\tilde{h}}}{2}\right)^{\frac{1}{2-p}}, \tag{99}$$

$p$ is the order of the utilized p-norm with $p>0$, $p \neq 2$, $\zeta_k = w_{k,\tilde{h}}$, and wherein the optional parameters $\zeta_k$ are determined in every iteration i by $$\zeta_k^{(i)} = w_{k,\tilde{h}}^{(i)} = \left|\frac{\mathring{y}_{k,\tilde{h}} - \hat{y}_{k,\tilde{h}}^{(i)}}{\beta_{k,\tilde{h}}}\right|^{p-2}, \tag{100}$$

for $k \in \{1, \ldots, K\}$.

13. The method of claim 12 wherein the optional factor in eq. 88 penalizes the difference $|\hat{y}_{k,\tilde{h}} - \tilde{y}_{k,\tilde{h}}|$ by the p-th power by specifically setting the factor $\psi(\tilde{y}, \zeta)$ to $$\psi_k(\tilde{y}_k, \zeta_k) = \sqrt{\frac{2\pi}{w_{k,\tilde{h}}}} \exp\left(\frac{-\beta_{k,\tilde{h}}^2 (2-p)(w_{k,\tilde{h}})^{\frac{-p}{2-p}}}{2p}\right), \tag{101}$$

for $k \in \{1, \ldots, K\}$.

14. The method of claim 1 wherein eq. 87 is $$p(\mathring{y}|\tilde{u}, \mathring{x}_0, \tilde{e}, \zeta) \propto \exp\left(-\frac{1}{2}\sum_{k=1}^{K} w_k (\mathring{y}_k - \tilde{y}_k)^T W_k (\mathring{y}_k - \tilde{y}_k)\right) \tag{102}$$

$$\exp\left(-\frac{1}{2}\sum_{k=1}^{K} w'_{k,\tilde{h}} (\mathring{y}_{k,\tilde{h}} + \eta_{k,\tilde{h}} - \tilde{y}_{k,\tilde{h}})^2\right) \cdot \exp\left(-\frac{1}{2}\sum_{k=1}^{K} \frac{\gamma_{\tilde{h}}^2}{w_{k,\tilde{h}}}\right)$$

$$\exp\left(-\frac{1}{2}\sum_{k=1}^{K} \frac{\gamma_{\tilde{h}}^2}{w'_{k,\tilde{h}}}\right)$$

wherein $W_k = \operatorname{diag}(w_{k,1}, \ldots, w_{k,\tilde{H}})$, $w_{k,\tilde{h}}'$ is an auxiliary weight, $\eta_{k,\tilde{h}}$ is the width of the bound at time k, $\gamma_{\tilde{h}}$ is a constant scale factor, $\zeta_k = (w_{k,\tilde{h}}, w_{k,\tilde{h}}')$, and wherein the optional parameters $\zeta_k$ are determined in every iteration i by $$\zeta_k^{(i)} = \left(w_{k,\tilde{h}}^{(i)}, w_{k,\tilde{h}}^{+(i)}\right) = \left(\left|\frac{\gamma_{\tilde{h}}}{\mathring{y}_{k,\tilde{h}} - \tilde{y}_{k,\tilde{h}}^{(i)}}\right|, \left|\frac{\gamma_{\tilde{h}}}{\mathring{y}_{k,\tilde{h}} + \eta_{k,\tilde{h}} - \tilde{y}_k^{(i)}}\right|\right), \quad (103)$$

for $k \in \{1, \ldots, K\}$.

15. The method of claim 14 wherein the optional factor in eq. 88 penalizes $\gamma(|\mathring{y}_{k,\tilde{h}} - \tilde{y}_{k,\tilde{h}}| + |\mathring{y}_{k,\tilde{h}} + \eta_{k,\tilde{h}} - \tilde{y}_{k,\tilde{h}}|)$ by specifically setting the factor $\psi(\tilde{y}, \zeta)$ to $$\psi_k(\tilde{y}_k, \zeta_k) = \qquad (104)$$
$$\sqrt{\frac{2\pi}{w_{k,\tilde{h}}}} \exp\left(\frac{-\gamma_{\tilde{h}}^2}{2w_{k,\tilde{h}}}\right) \exp\left(-\frac{1}{2}w'_{k,\tilde{h}}\left(\mathring{y}_{k,\tilde{h}} + \eta_{k,\tilde{h}} - \tilde{y}_{k,\tilde{h}}\right)^2\right) \exp\left(\frac{-\gamma_{\tilde{h}}^2}{2w'_{k,\tilde{h}}}\right),$$

for $k \in \{1, \ldots, K\}$.

16. The method of claim 1 wherein S is a linear mapping between at least one two-level component of u and at least one discrete-valued component of u.

17. A device for controlling an analog physical system, said device comprising:
- an output interface for generating said input signal u to the analog physical system and
- a digital control unit connected to said output interface and programmed with logic and instructions for carrying out the method of claim 1.

18. The method of claim 1 performed with respect to least one of:
- digital-to-analog conversion by feeding a discrete-valued signal into an analog low-pass filter,
- digital-to-analog conversion by feeding a discrete-valued signal into an analog band-pass filter,
- controlling an electric motor with at least one discrete-level input signal,
- controlling an electric power converter with at least one discrete-level input signal.

\* \* \* \* \*